US012508210B2

(12) United States Patent
Wallace

(10) Patent No.: US 12,508,210 B2
(45) Date of Patent: Dec. 30, 2025

(54) CONTAINER HAVING A CAP WITH RECORDABLE DEVICE AND IMPROVED PACKAGING PROFILE

(71) Applicant: Emily Jean Wallace, Madison Heights, MI (US)

(72) Inventor: Emily Jean Wallace, Madison Heights, MI (US)

( * ) Notice: Subject to any disclaimer, the term of this patent is extended or adjusted under 35 U.S.C. 154(b) by 179 days.

(21) Appl. No.: 18/122,359

(22) Filed: Mar. 16, 2023

(65) Prior Publication Data

US 2023/0293392 A1 Sep. 21, 2023

Related U.S. Application Data

(60) Provisional application No. 63/320,276, filed on Mar. 16, 2022.

(51) Int. Cl.

*A61J 7/04* (2006.01)
*A61J 1/03* (2023.01)
*B65D 43/02* (2006.01)

(52) U.S. Cl.

CPC . *A61J 7/04* (2013.01); *A61J 1/03* (2013.01); *B65D 43/0231* (2013.01); *A61J 2205/70* (2013.01)

(58) Field of Classification Search

CPC .. A61J 7/04; A61J 1/03; A61J 2205/70; A61J 1/1418; A61J 7/0076; B65D 43/0231
See application file for complete search history.

(56) References Cited

U.S. PATENT DOCUMENTS

| | | | | |
|---|---|---|---|---|
| 7,320,254 | B1 * | 1/2008 | Martin | B67B 3/261 73/862.21 |
| 7,926,966 | B2 * | 4/2011 | Winters | F21V 33/0024 362/240 |
| 8,896,428 | B2 * | 11/2014 | Shalala | A61J 7/0481 340/309.16 |
| 10,392,181 | B2 * | 8/2019 | Zonana | B65D 83/0409 |
| 2007/0014191 | A1 * | 1/2007 | Brandon | A61J 7/0472 368/10 |
| 2014/0130453 | A1 * | 5/2014 | Shalala | G04G 15/006 368/10 |
| 2022/0218137 | A1 * | 7/2022 | Iverson | G01G 23/365 |
| 2022/0306356 | A1 * | 9/2022 | Prodromou | B05B 11/0072 |

* cited by examiner

*Primary Examiner* — Michael Collins
(74) *Attorney, Agent, or Firm* — Panagos Kennedy PLLC; Bill Panagos; Linda Kennedy

(57) ABSTRACT

A container system with a recordable device having a substantially unaltered packaging profile when compared to standard commercially available prescription containers. The container includes a bottle having a cylindrical body having a length greater than its width. A cap is provided with an inclined spiral or helical land and stops to permit it to be affixed to the container. The cap is equipped with a snap fit ring or a fitting on its underside. A recording device is configured with a land or snap ring removably engageable with the snap fit ring on the underside of the cap. The cap has an aperture to accommodate a recording switch on the recording device. The cap is provided with a speaker switch aperture to permit the user to activate the message on the recording device to hear about the contents of the bottle.

5 Claims, 6 Drawing Sheets

CONTAINER HAVING A CAP WITH RECORDABLE DEVICE AND IMPROVED PACKAGING PROFILE

TECHNICAL FIELD

In one aspect, the disclosure relates to a container having cap with a recordable device to alert the user to the contents of the container.

In another aspect this disclosure relates to a container with a recordable device included in the container cap that does not change the external packaging profile of the container In another aspect, this disclosure relates to a reusable cap with a reusable recording device wherein the recording device is removably affixed to the container cap and can be re-used with multiple container caps.

BACKGROUND

Recordable devices for use with a container to remind patients to take their medications are known in the art. These devices are electronic digital recorders that are affixed to the top of a prescription pharmaceutical container, such as a pill bottle, that alert the patient/user that a certain medication is in the bottle and/or the time intervals to take the medication. Oftentimes, there is also an alert signal given so the patient may take the prescribed medication at the same time each day, or at the prescribed intervals. Such devices are usually "add ons" to the prescription container. Generally, the electronic recordable device may be adhered to the top or the bottom of the bottle, thereby altering the "packaging profile" of the container. This altered packaging profile may pose "storage issues and medicine cabinets, or shelves may have a limited space and may be set to the "standard" sizes of pharmaceutical containers. Also, because they are "add ons", such devices are not suitable for use by the bottle manufacturers as the altered packaging profile will present shipping and storage issues, thereby contributing to increased costs of transit. These issues and more are addressed by the present disclosure.

SUMMARY

In one embodiment, there is disclosed a prescription container system with a recordable device having a substantially unaltered packaging profile when compared to standard commercially available prescription containers. The container includes a bottle having a generally (but not necessarily) cylindrical body having a length greater than its width. In one embodiment, the container has closed bottom, and transparent sidewalls extending therefrom for the length of the bottle, the bottle terminates in a mouth portion having inclines and lands disposed circumferentially around the mouth as is well known in the art to permit a cap to be affixed to the container. A cap is provided that includes an inclined land and stops to permit it to be affixed to the container at the mouth such as by a twisting or screw motion. The cap is equipped with a snap fit ring or a fitting on its underside. A recording device may be configured to have a land or snap ring removably engageable with the snap fit ring or fitting on the underside of the cap. The cap is further equipped to have an aperture to accommodate a recording switch on the recording device such that the recording switch is activatable from the exterior surface of the cap. In addition, the cap is provided with a speaker switch button aperture to permit the user to activate the message on the recording device to hear about the contents of the bottle.

DETAILED DESCRIPTION

Figure 1:
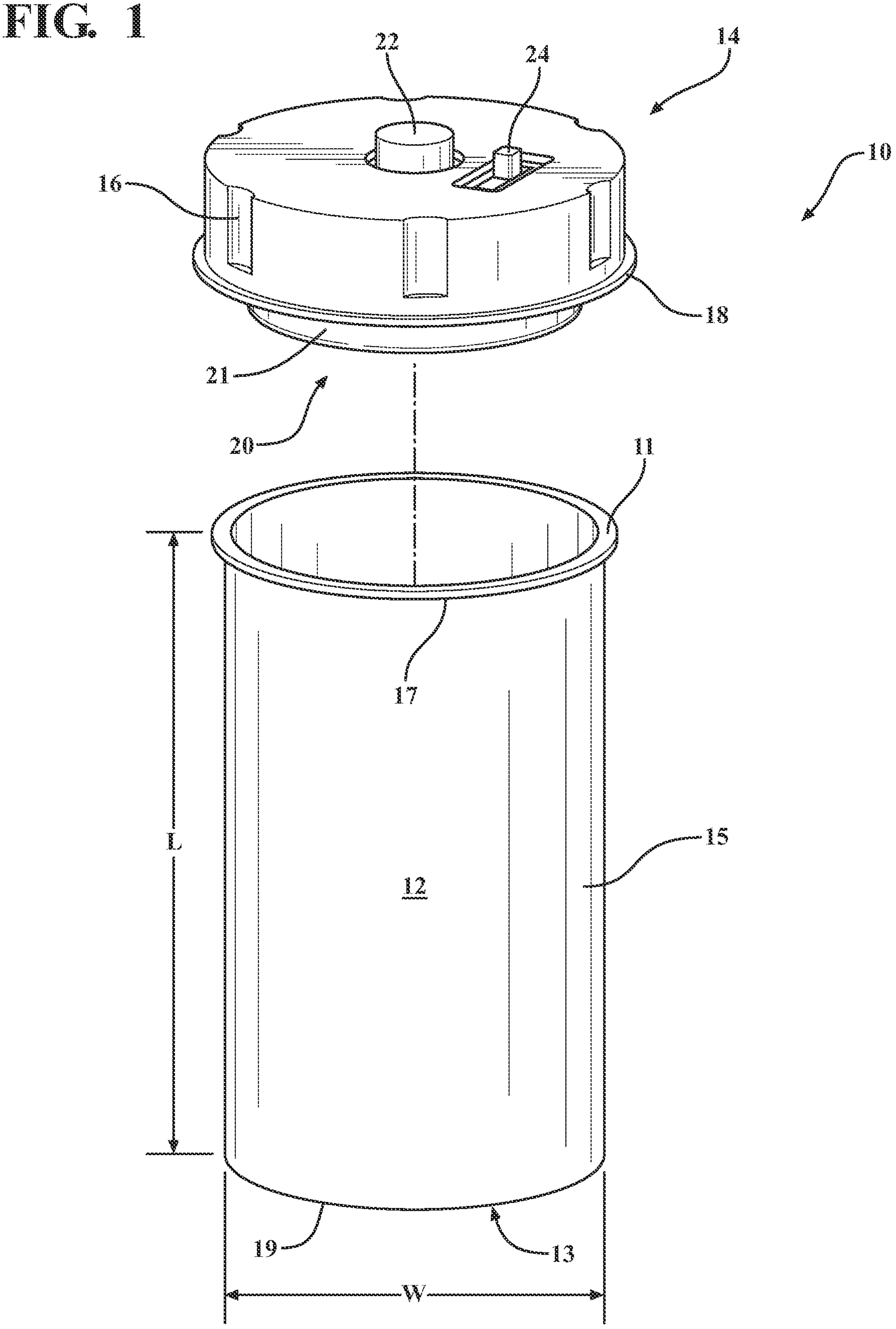
FIG. 1 is a side perspective view of a bottle having improved packaging profile according to one aspect of this disclosure.

Turning now to the drawings wherein like numbers refer to like structures, FIG. 1 is a side perspective view of a prescription container or bottle 10 having a length L and a width W and sidewalls 15 extending along length L from the periphery 19 of bottom 13 and terminating in a mouth portion or opening 11, thereby forming a generally hollow cylindrical container closed at bottom 13. The mouth portion or opening 11 may be equipped with a snap ring or a land 17 with stops to accommodate a removable twist or snap mating connection with the cap 14. The container may be transparent to permit a user to see the contents of the container and tinted to a color as used in the pharmaceutical industry.

The cap 14 has finger grips 16 arranged around its outer periphery and a ring or flange 18 around its lower outer periphery to permit tactile differentiation between the cap and the bottle when the container is closed. A recordable device 20 is shown in the cap with a speaker switch 22 and a recorder switch 24 extending through access apertures 34 and 32 (See FIG. 4). The recordable device is snap fit into place on the underside of the cap.

Figure 2:
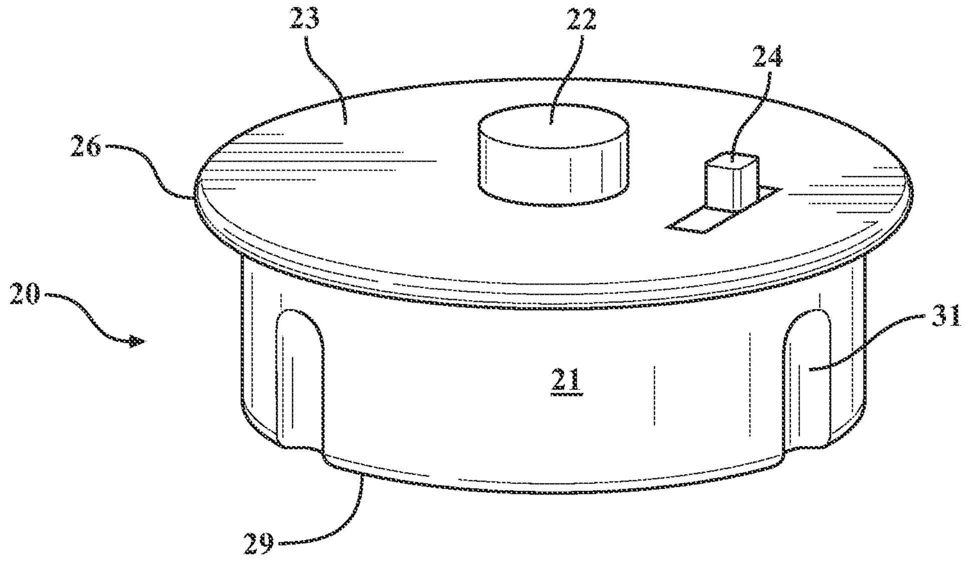
FIG. 2 is side perspective view of one type of recording device that may be used with the container of one aspect of this disclosure.
Figure 3:
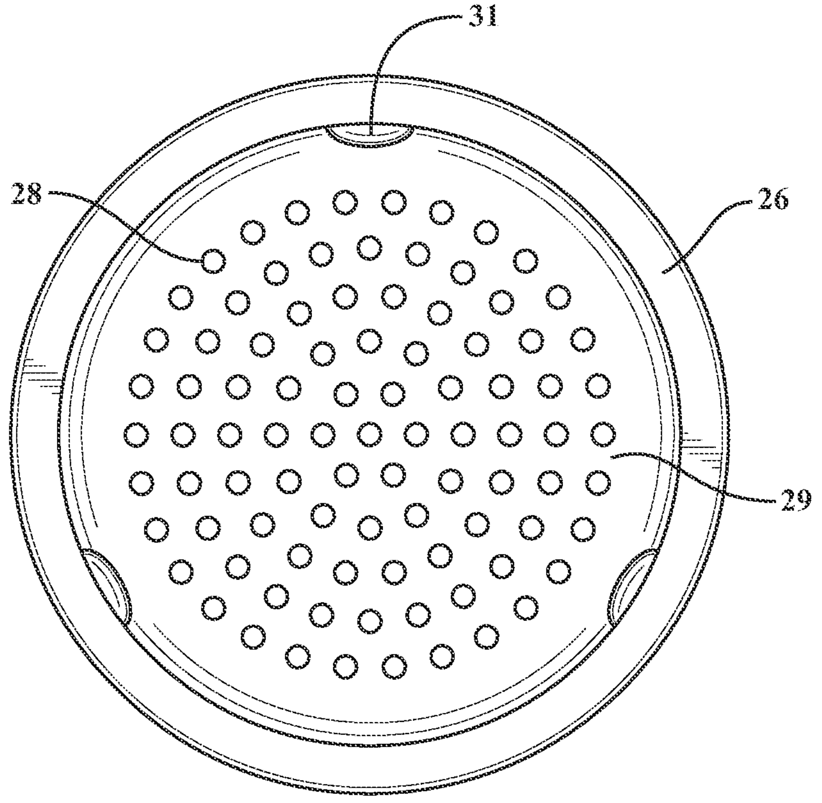
FIG. 3 is a bottom view of the recording device of FIG. 2 showing some feature of its construction.
Figure 9:
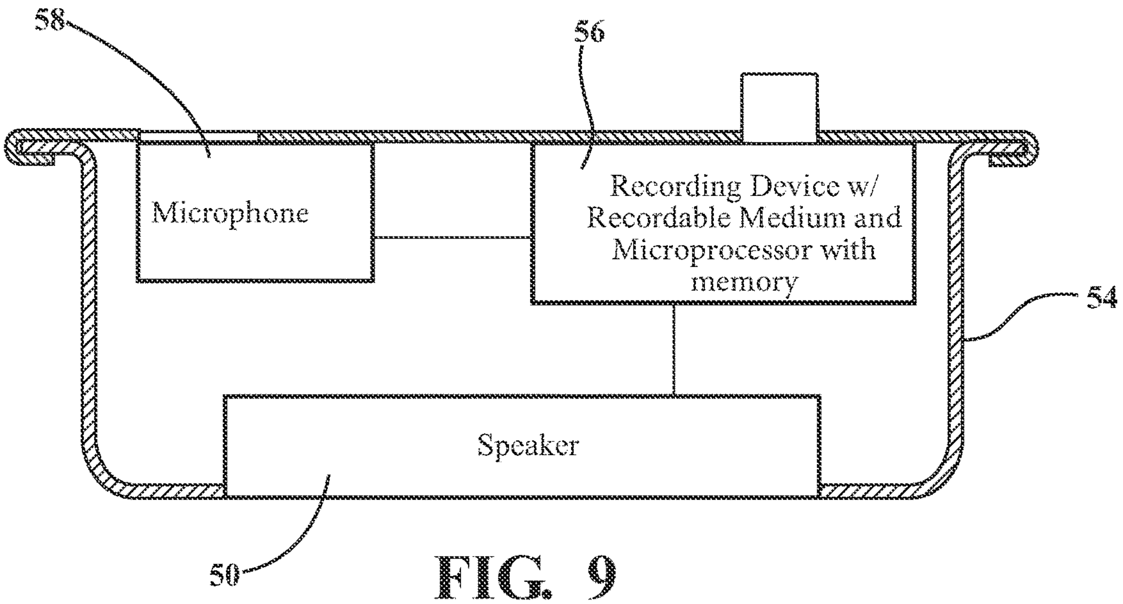
FIG. 9 is a schematic representation of the recording device.

Turning now to FIGS. 2, 3 and 9, a generally cylindrical recording device 20 is shown having a body 21 where the electronics are located. These electronics include a recordable media or a digital recorder 48 as well as a speaker 50 and a microphone 58. The microphone, recordable media and the speaker are electrically connected to each other and are powered by a battery 60. The top surface 23 of the recorder has a speaker switch 22 and a recorder switch 24. An annular flange 26 extends circumferentially around the top surface of the recorder. The speaker body 27 has speaker apertures 28 at its bottom surface 29 to permit sound to emanate from the device. Finger grips 31 are provided along the periphery of the body 21 to permit a user to grip twist or force the recorder device into snapping engagement with the interior surface of a cap.

Figure 4:
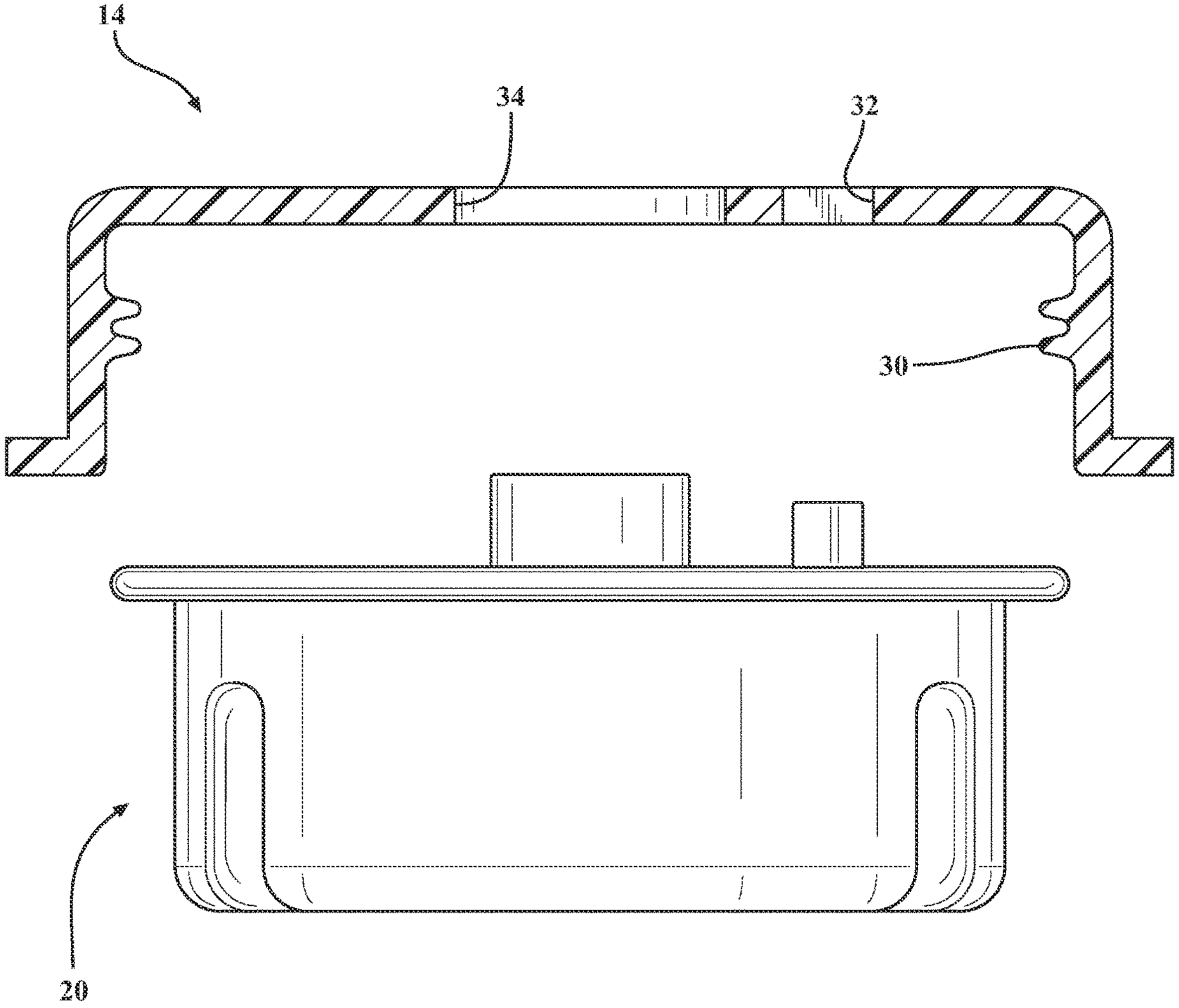
FIG. 4 is a side view of the recording device of FIG. 2 and cutaway view of a cap useful in one embodiment of this disclosure showing its construction.

Turning to FIG. 4, the cap 14 is show in in a cutaway side view to depict the inclined lands or snap fits 30 extending along the interior surface perimeter of the cap. The recording device is snap fitted into mating engagement with the land or snap fits, thereby ensuring engagement with the cap. Note the switches on the recording device must be aligned with their respective apertures in the cap to facilitate the snap fit. It should be understood that an adhesive strip could also be used to adhere the recording device into position in the cap as well.

Figure 5:
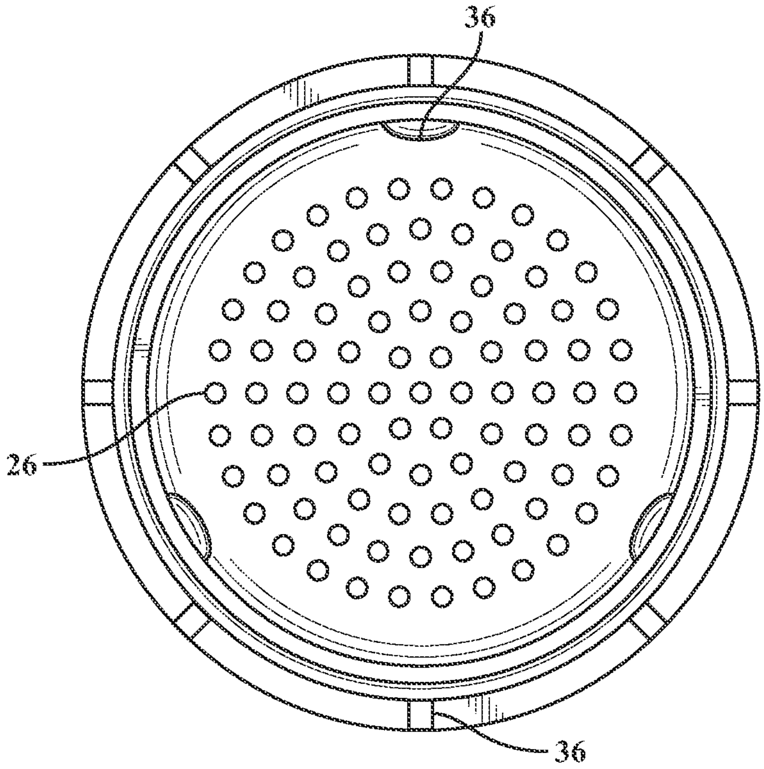
FIG. 5 is a bottom view of the cap of FIG. 4, with the recording device installed therein.
Figure 6:
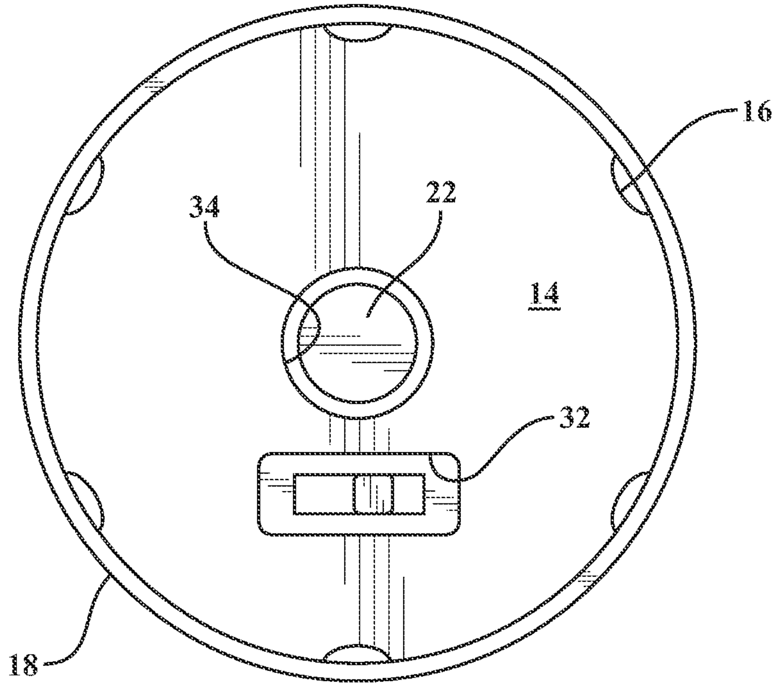
FIG. 6 is a top view of the cap showing the recording device installed therein.

Turning to FIGS. 5 and 6, the recording device is shown in mating engagement with the cap. The switches are aligned with their respective access apertures and the cap may be installed onto a prescription container. The user activates the recorder switch and records instructions as to the bottle contents, the time for taking the prescriptions, and the type of medication is in the bottle. This will assist persons having impaired vision to have access to that type of information even if they cannot read the label of the bottle.

A schematic representation of the recording device is shown in FIG. 9. Specifically there is shown therein a cutaway view of the recorder body to reveal one embodiment of the recording device. There is shown a speaker, which may be separate or integrated with the recording device recordable medium. The recoding medium may be any electronic memory storage. When the user wishes to record a message, the activation switch is depressed and the message is recorded. The message may be replayed until the user is satisfied it is correct. The activation switch may then be depressed again, so the desired message is stored in the recording medium. To play the message, the user pushes the activation switch and the message plays. The device further records the time and number of times the message is played each day. That is one way to alert the user every time the activation switch is pressed when they last took the medicine. When it is desired to erase the message and record a new message, the activation switch is depressed twice and the recording is erased, permitting a new message to be recorded in its place.

Figure 7:
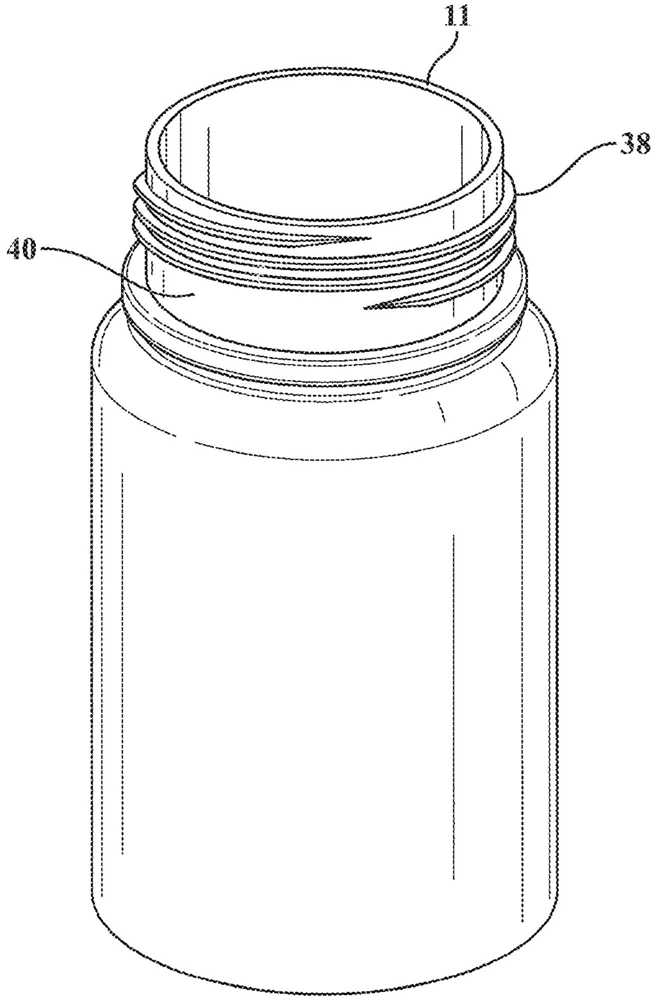
FIG. 7 is a side view of another embodiment of the container showing a threaded opening.
Figure 8:
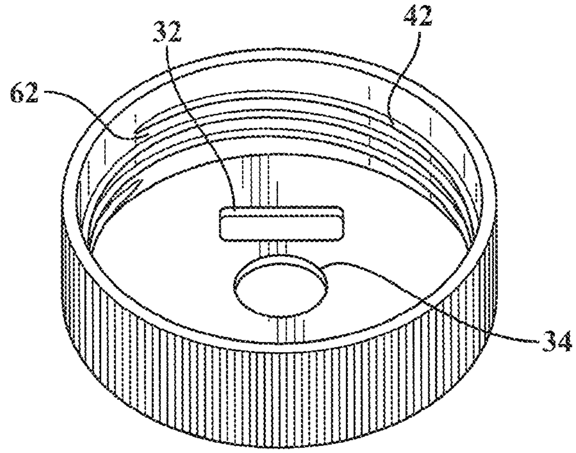
FIG. 8 is a bottom perspective view of a threaded cap with a central aperture therethrough to mount the recording device therein and thread the cap onto the container of FIG. 7.

FIGS. 7 and 8 illustrate another embodiment of the container wherein the container is equipped with threads 38 in a spiral or helical manner circumferentially around the outside surface 40 the mouth portion 11 of the container. The land has an entrance 62 and may also have a stop to cooperatively engage tabs on the bottle to alert the use the cap is secured over the mouth. As seen in FIG. 8, the cap has threads 42 arranged circumferentially along the inner periphery 44. As is well known, the cap is rotated clockwise relative to the container the secure it into place. To release the cap, the cap is turned counterclockwise.

Figure 10:
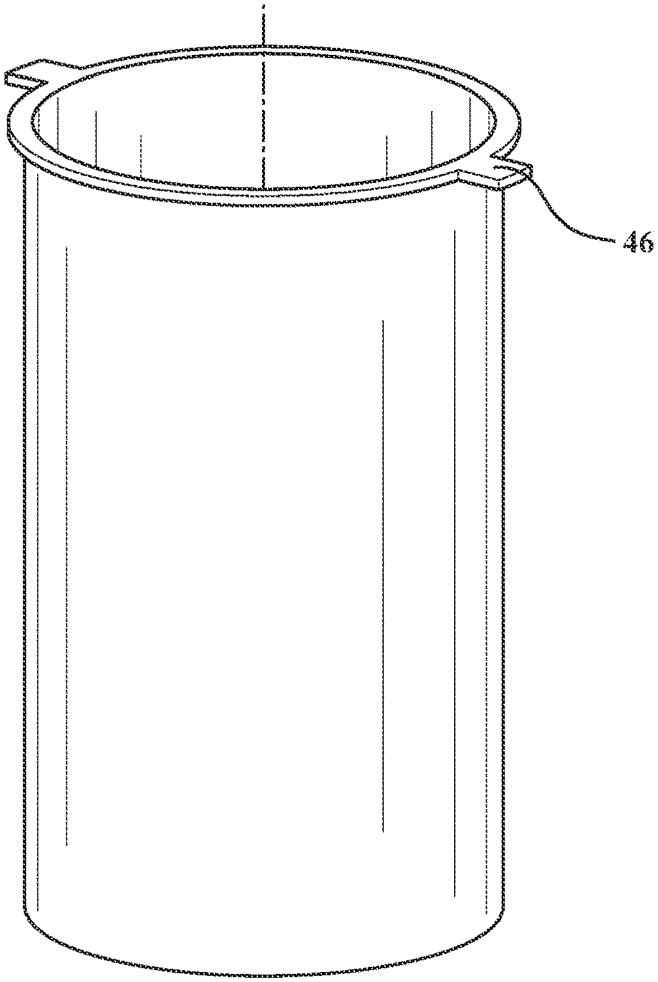
FIG. 10 is another embodiment of the bottle having tabs at the opening to cooperate with the cap.

FIG. 10 is another embodiment of the bottle with tabs 46 at its opening to cooperatively engage with an inclined helical or spiral land in the cap to permit the user to twist the cap on or off, as needed.

When the bottle or container is empty, the recording device may be reused with the next prescription by simply re-recoding the necessary message onto the device and screwing the cap onto a prescription bottle or removing the recording device and snap fitting it into the next cap (provided there are access openings for the recorder switches). The device as described presents the same profile for the prescription bottle as a prescription bottle not equipped with the device. This will permit ease of storage and shipping without increased handling costs.

Those skilled in the art will recognize that only the embodiments disclosed are examples of various configurations. The words used are words of description, not words of limitation. Many modifications and variations may be possible without departing from the scope of the invention.

What is claimed:

1. A container system comprising;

a bottle having a length L and a width W and sidewalls extending along length L from periphery of a bottom and terminating in a mouth portion, thereby forming a generally hollow container closed at the bottom;

a cap with an underside, said underside having a land, said cap equipped with finger grips arranged around an outer periphery and a ring or flange around a lower outer periphery to permit tactile differentiation between the cap and the bottle when the container is closed; and, a recording device secured on the underside of the cap; said recording device has a snap ring and the cap has a complimentary snap ring on an interior surface of the cap underside; said cap snap ring complimentary to said recording device snap ring; said recording device snap ring in mating engagement with said snap ring on said interior surface of the cap underside; said recording device equipped with a recordable medium and a speaker; said recording device having a recorder switch and a speaker switch; each said switch extending through access apertures in the cap.

2. The container system of claim 1, wherein the recording device has at least one opening to permit sound from the speaker to emanate from the device.

3. The container system of claim 1, wherein the bottle is cylindrical and the cap is cylindrical and equipped with threads along an inner periphery, and the bottle has threads along an outer periphery near the mouth portion; said cap threads and said bottle threads cooperatively engageable with each other.

4. The container system of claim 1, wherein the land is a spiral or helical land having an entrance at a first end.

5. The container system of claim 1, wherein the bottle includes a tab on a periphery of the mouth to cooperatively engage the land in the cap.

* * * * *